(12) United States Patent
McDowell

(10) Patent No.: US 7,600,214 B2
(45) Date of Patent: Oct. 6, 2009

(54) USE OF METADATA FOR SEAMLESS UPDATES

(75) Inventor: Curtis McDowell, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 672 days.

(21) Appl. No.: 11/156,700

(22) Filed: Jun. 21, 2005

(65) Prior Publication Data

US 2006/0236316 A1    Oct. 19, 2006

Related U.S. Application Data

(60) Provisional application No. 60/672,048, filed on Apr. 18, 2005.

(51) Int. Cl.
*G06F 9/44* (2006.01)
(52) U.S. Cl. ...................................................... 717/100
(58) Field of Classification Search .................. 717/100, 717/103–104, 168–169, 171, 108–109; 709/218–219, 709/242; 370/216, 218
See application file for complete search history.

(56) References Cited

U.S. PATENT DOCUMENTS

| | | | | |
|---|---|---|---|---|
| 5,634,127 | A * | 5/1997 | Cloud et al. | 719/313 |
| 6,253,369 | B1 * | 6/2001 | Cloud et al. | 717/136 |
| 6,567,417 | B2 * | 5/2003 | Kalkunte et al. | 370/428 |
| 6,785,261 | B1 * | 8/2004 | Schuster et al. | 370/352 |
| 6,912,668 | B1 * | 6/2005 | Brown et al. | 714/6 |
| 6,937,576 | B1 * | 8/2005 | Di Benedetto et al. | 370/256 |
| 6,993,530 | B2 * | 1/2006 | Lee et al. | 707/100 |
| 7,002,905 | B1 * | 2/2006 | Khouri et al. | 370/216 |
| 7,082,130 | B2 * | 7/2006 | Borella et al. | 370/389 |
| 7,088,995 | B2 * | 8/2006 | Rao | 455/418 |
| 7,177,946 | B1 * | 2/2007 | Kaluve et al. | 709/242 |
| 7,339,904 | B2 * | 3/2008 | Pedlar et al. | 370/328 |
| 2002/0046260 | A1 * | 4/2002 | Day, II | 709/219 |
| 2006/0132866 | A1 * | 6/2006 | Okamoto | 358/502 |
| 2006/0225032 | A1 * | 10/2006 | Klerk et al. | 717/105 |
| 2007/0276692 | A1 * | 11/2007 | Mei et al. | 705/1 |

OTHER PUBLICATIONS

Field et al. "Transactors:a programming model for maintaining globally consistent distributed state in unreliable environments", Jan. 2005, ACM, SIGPLAN Notices, vol. 40 Issue 1, pp. 195-208.*

* cited by examiner

*Primary Examiner*—Wei Y Zhen
*Assistant Examiner*—Anna Deng

(57) ABSTRACT

The invention provides a system and method for updating software in the CPU of a network device without interrupting the operation of the network device. The invention determines whether operating state information is recoverable. If it is not recoverable, then it will be stored in a metadata module or reload buffer. When the CPU is rebooted, after a software update or crash, it operates in a special reload mode and is able to recover any system state information not available in the network device from the metadata module.

15 Claims, 4 Drawing Sheets

Initialization Table

Port (x)
Vlan (z)
 L2
 L3
linkscan
 Trunk
 Mirror
 .
 .
 .
 .
 .
 .
 .
 .
 .

Fig. 4

USE OF METADATA FOR SEAMLESS UPDATES

CROSS-REFERENCE TO RELATED APPLICATIONS

This application claims priority of U.S. Provisional Patent Application Ser. No. 60/672,048, filed on Apr. 18, 2005. The subject matter of this earlier filed application is hereby incorporated by reference.

BACKGROUND OF THE INVENTION

1. Field of the Invention

The invention relates to a method and apparatus for high performance switching in local area communications networks such as token ring, ATM, and Ethernet at any speed environments, generally known as LANs. In particular, the invention relates to a method and apparatus for updating software in a network device without disrupting the operation of the device.

2. Description of the Related Art

Computer networks are commonly used to send and receive data, to share resources, and to provide communication between remote users. As computer performance has increased in recent years, the demands on computer networks has also significantly increased; faster computer processors and higher memory capabilities require networks with high bandwidth capabilities to enable high speed transfer of significant amounts of data. Based upon the Open Systems Interconnect (OSI) 7-layer reference model, network capabilities have grown through the development of devices such as repeaters, bridges, routers, and switches, which operate with various types of communication media. Collectively, these devices may be referred to as network devices. Thickwire, thinwire, twisted pair, and optical fiber are examples of media which has been used for computer networks. The network devices may be interconnected by a high speed local data link such as a local area network (LAN), token ring, Ethernet, etc.

Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to as wirespeed or linespeed, which is the maximum speed capability of the particular network.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network. The spanning tree algorithm defines a protocol for preventing data loops. Layer three switches, sometimes referred to as routers, can forward packets based upon the destination network address. Layer three switches are capable of learning addresses, maintaining tables thereof which correspond to port mappings, and changing packet data in the process. Processing speed for layer three switches can be improved by utilizing specialized high performance hardware, and offloading the host CPU so that instruction decisions do not delay packet forwarding.

SUMMARY OF THE INVENTION:

Embodiments of the present invention include a network device. The network device may include a central processing unit (CPU) and/or a CPU interface. The network device may also include tables storing operating state information, and a metadata module storing the operating state information that is not recoverable from the tables. When the CPU is operating in reload mode, the CPU may retrieve required information from the metadata module.

Embodiments of the present invention may also include a method for updating software in a central processing unit (CPU) of a network device. The method may include determining whether operating state information stored in a metadata module of the network device is recoverable, and updating the metadata module with the operating state information that is determined to be not recoverable. The method may further include determining whether the CPU is operating in complete initialization mode or reload initialization mode after reboot, and retrieving, when the CPU is operating in reload mode, the operating state information from the metadata module upon reboot.

Embodiments of the present invention may further include a network device. The network device may include processing interface means for communicating with a CPU and processing data packets, table means for storing operating state information, and module means for storing the operating state information that is not recoverable from the tables. When the CPU is operating in reload mode, the CPU will retrieve required information from the metadata module.

BRIEF DESCRIPTION OF THE DRAWINGS

For proper understanding of the invention, reference should be made to the accompanying drawings, wherein:

FIG. 4 illustrates an example of an initialization table according to one embodiment of the invention.

DETAILED DESCRIPTION OF THE PREFERRED EMBODIMENT(S):

The present invention provides a system and method for updating software in a central processing unit (CPU) of a network device without interrupting the operation of the network device. Therefore, the present invention provides the capability for performing seamless software updates without affecting the performance or operation of the network device.

The network device of the present invention may be a switch-on-chip (SOC) with switching and computational capabilities. Additionally, the network device may be a network hardware component capable of generating, receiving and processing packets. The network device may have switching and/or routing capabilities appropriate to a local area network (LAN) or other communication network. Furthermore, the network device may include a CPU or CPU functionality, or, alternatively, may be in communication with an external CPU via a CPU interface.

Figure 1:
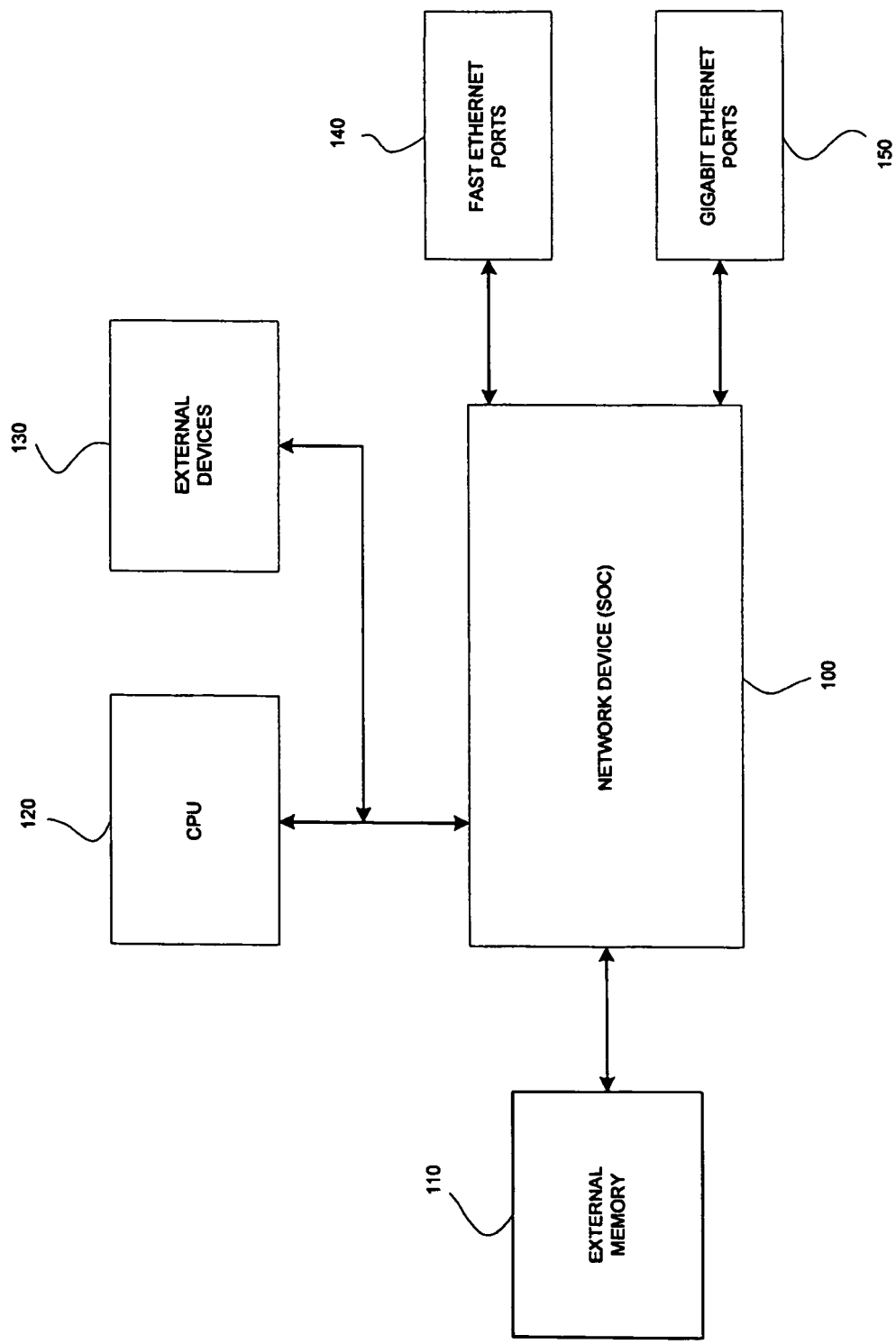
FIG. 1 illustrates a network device according to an embodiment of the invention.

FIG. 1 illustrates a system according to an embodiment of the present invention. A network device 100 is functionally connected to external devices 130, external memory 110, fast Ethernet ports 140, and gigabit Ethernet ports 150. External devices 130 may include other switching devices for expanding switching capabilities, or other devices which may be required by a specific application. External memory 110 is additional off-chip memory, which is in addition to internal memory which is located in the network device 100. CPU 120 may be used, as necessary, to program the network device 100 with rules which are appropriate to control packet processing. Once network device 100 is appropriately programmed or configured, the network device 100 will operate, as much as possible, in a free running manner without communicating with CPU 120. Involvement of the CPU 120, however, may be necessary in certain exceptional situations, as will be further discussed below. Since CPU 120 does not control every aspect of the operation of network device 100, CPU 120 performance requirements are fairly low. A less powerful and less expensive CPU 120 can therefore be used when compared to known network devices.

Any number of fast Ethernet ports 140 and gigabit Ethernet ports 150 may be provided. In addition, the ports may be 10-gigabit Ethernet ports, proprietary fabric ports, or other types of communication ports. In one embodiment of the invention, 24 fast Ethernet ports 140 and 2 gigabit ports 150 can be provided. Similarly, additional interconnect links to additional external devices 130, external memory 110, and CPU(s) 120 may be provided as necessary.

Figure 2:
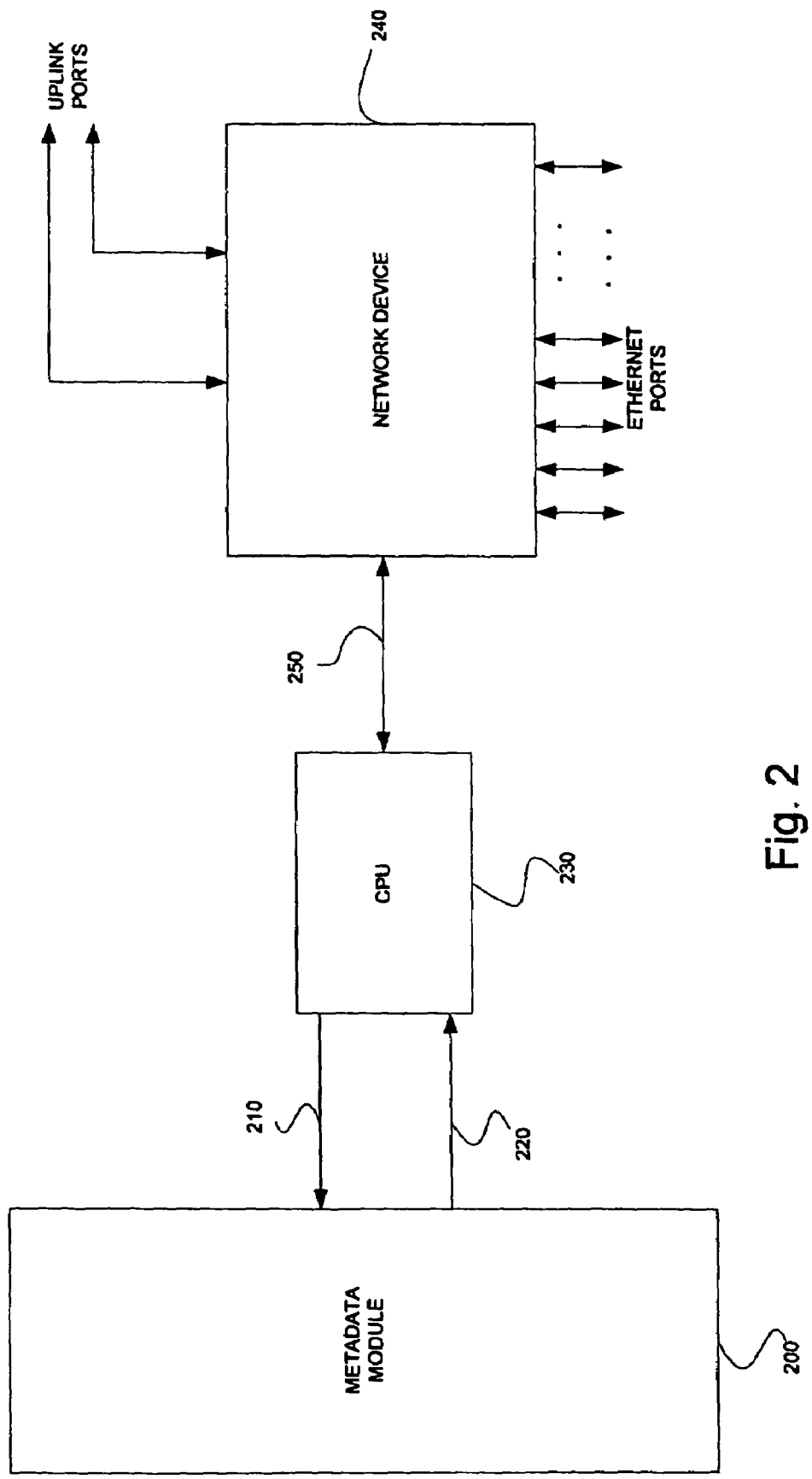
FIG. 2 illustrates a network device according to another embodiment of the invention.

FIG. 2 illustrates a system according to one embodiment of the present invention. A network device 240 with a plurality of data ports is connected to a CPU 230 via a CPU interface 250. Although, FIG. 2 illustrates the network switch with two uplink ports and six data ports, any number of data ports may be provided. The CPU 230 is connected to a metadata module 200 by links 210, 220.

During normal operation, the CPU 230 performs the protocols which may be considered relatively low bandwidth background maintenance. Occasionally, however, there is an exceptional case that will require the involvement of the CPU 230. For example, the network device 240 may receive a packet from a new host it cannot recognize. In this situation, the network device 240 forwards the packet to the CPU 230 which can run protocols to determine the host address and determine how best to handle this packet. If such an exceptional case were received by the network device 240 while the CPU 230 was not operating for any reason, the network device 240 would not be able to handle the packet properly.

The present invention provides a system and method which allows the network device 240 to continue normal operation, including the sending and receiving of data packets, while the CPU 230 is not operating for any reason. More specifically, the present invention allows the CPU 230 to be taken down, while software updates or maintenance is performed, and, when the CPU 230 is brought back on-line, the CPU 230 will be able to learn what was occurring in the network device 240 during the time period that the CPU 230 was not operating. In addition, according to an embodiment of the invention, most of the exceptional cases needing CPU involvement that are received by the network switch 240 during the time that the CPU 230 is not available, will be waiting for the CPU 230 once it is brought back on-line. Some of the exceptional cases, however, may be lost while the rest of the exceptional cases will remain queued in the hardware awaiting CPU 230 to come back on-line. The exceptional cases which may be lost are those that have already been transferred from the hardware queue to the software queue; nonetheless, it is assumed that the cases that are lost will be retried since they are made on behalf of protocols designed for unreliable network delivery.

The functionality outlined above is implemented, according to one embodiment of the invention, by providing a metadata module 200 or reload buffer for storing operating state information. The metadata module 200 may be comprised of any data storage structure, such as a database. Since some operating state information can be recovered from device configuration tables contained in the network device, not all operating state information needs to be stored in the metadata module 200. The device configuration tables contained within the network device 240 may include entries relating to port information, vlan configuration, L2 and L3 look-up tables, truking configuration, mirroring configuration, etc. FIG. 4 illustrates an example of some of the entries in an initialization table contained within the network device.

Therefore, when an entry is made in any of the configuration tables in the network device 240, it is classified as recoverable or non-recoverable. If the information is not recoverable, then an entry containing that information is made in the metadata module 200 such that it will be available to the CPU 230. This entry can be made via the link 210. The metadata module 200 may be implemented as a non-volatile memory, a buffer memory in the CPU 230, a disk file, or flash storage. While the metadata module 200 may be implemented via numerous data structures, the metadata module 200 has a non-volatile nature in that its contents are preserved across CPU 230 restarts.

When the CPU 230 is taken down, updated, and then rebooted, it is rebooted such that it is operating in a special reload mode. The CPU 230 will then download the information stored in the configuration tables of the network device 240 via the link 250. If the CPU 230 cannot determine, via the network device configuration table information, what was occurring in the network device 240 prior to the time that the CPU 230 ceased operating, it will consult the metadata module 200. Any information that was not readily recoverable from the configuration tables in the network device 240 should be stored in the metadata module 200, and will be downloaded by the CPU 230 via the link 220. An example of an entry that is made in the metadata module 200, according to an embodiment of the invention, is a default vlan entry. The default vlan entry identifies which entry in the vlan table, which is stored in the network device 240, should be the default vlan entry.

As a result, the CPU 230 will have a clear picture of all of the events that were occurring in the network device 240 prior to the time that the CPU was not operational. Additionally, the CPU 230 will be able to handle any exceptional cases, such as those discussed above. Moreover, the network device 240 is able to continue its normal operation without disruption.

Once the CPU 230 has initialized or loaded the information it requires from the network device tables and the metadata module 200, the CPU 230 will exit the special reload mode. The operating state information stored in the metadata module 200 may only be reset upon entering global or complete initialization mode.

Figure 3:
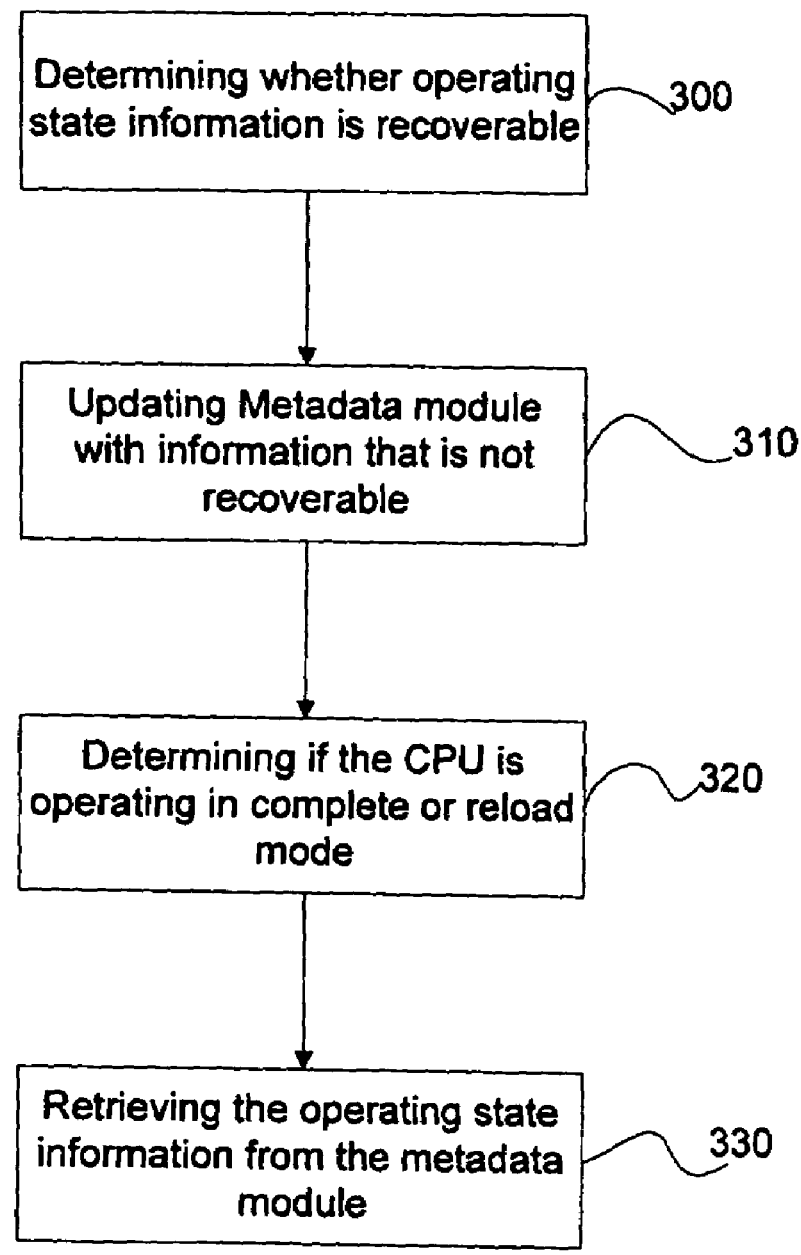
FIG. 3 illustrates a method according to an embodiment of the invention.

FIG. 3 illustrates a method according to one embodiment of the present invention. The method may include the steps of determining whether operating state information stored in configuration tables of the network device is recoverable or not 300. Operating state information that cannot be recovered by the CPU from the network device tables upon reload of the CPU may be stored in the metadata module. As such, the method also includes the step of updating the metadata module with operating state information that is not recoverable from the configuration tables within the network device 310.

Additionally, the method includes the step of determining whether the CPU is operating in complete initialization mode or reload mode 320. When the CPU crashes or an update to the software is made, the CPU is rebooted in reload mode. If the CPU is operating in reload mode, it will retrieve the information it can from the tables in the network device and retrieve all other operating state information it requires from the metadata module 330. If the CPU is operating in complete initialization mode, it will clear and reinitialize both the device configuration tables and the metadata module.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A network device, comprising:
   a central processing unit (CPU) configured to assist the network device with processing one or more data packets;
   tables configured to store operating state information associated with the processing one or more data packets; and
   a metadata module configured to store the operating state information that is non-recoverable from the tables;
   wherein, when the CPU becomes unavailable, the network device is configured to:
      continue the processing one or more data packets,
      update the tables with the operating state information,
      determine whether the operating state information stored in the tables is non-recoverable operating state information, and
      update the metadata module with the non-recoverable operating state information based on determination; and
   wherein, when the CPU becomes available, the CPU is configured to:
      retrieve the recoverable operating state information from the tables, and
      if the recoverable operating state information retrieved from the tables is incomplete, retrieve the non-recoverable operating state information from the metadata module.

2. The network device of claim 1, wherein the metadata module comprises non-volatile memory.

3. The network device of claim 1, wherein the CPU becomes unavailable due to a crash or software update.

4. A computer-implemented method for updating software in a central processing unit (CPU) of a network device, the method comprising:
   configuring the CPU to assist the network device in processing one or more data packets;
   storing operating state information in tables of the network device, wherein the operating state information associated with the processing one or more data packets;
   storing non-recoverable operating state information from tables in a metadata module;
   determining that the CPU becomes unavailable;
   while the CPU is unavailable:
      continuing the processing one or more data packets,
      updating the operating state information in the tables,
      determining whether the operating state information stored in the tables is non-recoverable, and
      updating the non-recoverable operating state information in the metadata module based on the determination; and
   determining that the CPU becomes available after the software update, wherein the CPU is configured to:
      retrieve the recoverable operating state information from the tables, and
      if the recoverable operating state information retrieved from the tables is incomplete, retrieve the non-recoverable operating state information from the metadata module.

5. The method of claim 4, wherein storing non-recoverable operating state information in the metadata module comprises updating the metadata module comprising non-volatile memory.

6. The method of claim 4, wherein the CPU becomes unavailable due to a crash or the software update.

7. A network device comprising:
   processing means for processing one or more data packets with assistance from a central processing unit (CPU);
   table means for storing operating state information associated with the processing one or more data packets; and
   module means for storing non-recoverable operating state information from the tables;
   wherein, when the CPU becomes unavailable:
      the processing means continues the processing one or more data packets,
      the table means updates the operating state information,
      determining means for determining whether the operating state information stored in the tables means is non-recoverable operating state information, and
      the module means updates the non-recoverable operating state information based on determining means; and
   wherein when the CPU becomes available:
      the table means provides the recoverable operating state information for the CPU, and
      if the recoverable operating state information from the table means is incomplete, the module means provides the non-recoverable operating state information for the CPU.

8. The network device of claim 7, wherein the module means comprises non-volatile memory.

9. The network device of claim 7, wherein the CPU becomes unavailable due to a crash or a software update.

10. The network device of claim 1, wherein the CPU is configured to receive the one or more packets for processing from a new host the network device cannot recognize.

11. The network of device of claim 1, wherein tables are configured to store both recoverable operating state information and the non-recoverable operating state information.

12. The network device of claim 1 configured to determine whether the operating state information stored in the tables is recoverable operating state information or non-recoverable operating state information, wherein non-recoverable operating state information includes information transferred from a hardware queue to a software queue.

13. The network device of claim 1, wherein the CPU is configured to clear the tables and the metadata module after retrieving the recoverable and non-recoverable operating state information.

14. The network device of claim 1, wherein when the CPU becomes available, the CPU is configured to retrieve the recoverable operating state information from the tables further comprising:
- make a determination whether the recoverable operating state information is incomplete; and
- retrieve the non-recoverable operating state information from the metadata module based on the determination whether the recoverable operating state information is incomplete.

15. The method of claim 4 further comprising:
- determining that the CPU is operating in a complete initialization mode after retrieving the operating state information from the tables and the metadata module; and
- clearing the tables and the metadata module based upon the determination that the CPU is operating in the complete initialization mode.

\* \* \* \* \*

UNITED STATES PATENT AND TRADEMARK OFFICE
CERTIFICATE OF CORRECTION

PATENT NO.      : 7,600,214 B2                    Page 1 of 1
APPLICATION NO. : 11/156700
DATED           : October 6, 2009
INVENTOR(S)     : Curtis McDowell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 926 days.

Signed and Sealed this

Fifth Day of October, 2010

David J. Kappos
*Director of the United States Patent and Trademark Office*